(12) United States Patent
Belluomini et al.

(10) Patent No.: US 8,364,924 B2
(45) Date of Patent: Jan. 29, 2013

(54) ACHIEVING A HIGH THROUGHPUT IN A STORAGE CACHE APPLICATION USING A FLASH SOLID STATE DISK

(75) Inventors: Wendy A. Belluomini, San Jose, CA (US); Binny S. Gill, Auburn, MA (US); Michael A. Ko, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 12/603,113

(22) Filed: Oct. 21, 2009

(65) Prior Publication Data
US 2011/0093648 A1 Apr. 21, 2011

(51) Int. Cl.
*G06F 12/02* (2006.01)
(52) U.S. Cl. ........ 711/165; 711/103; 711/118; 711/133; 711/E12.008; 711/E12.017; 711/E12.069
(58) Field of Classification Search ........................ None
See application file for complete search history.

(56) References Cited

U.S. PATENT DOCUMENTS

| | | | | |
|---|---|---|---|---|
| 6,678,785 B2 | 1/2004 | Lasser | | 711/103 |
| 2003/0177305 A1* | 9/2003 | Hetrick | | 711/113 |
| 2007/0233937 A1* | 10/2007 | Coulson et al. | | 711/103 |
| 2008/0209151 A1* | 8/2008 | Inoue | | 711/167 |
| 2009/0259800 A1* | 10/2009 | Kilzer et al. | | 711/103 |
| 2009/0259801 A1* | 10/2009 | Kilzer et al. | | 711/103 |
| 2011/0289261 A1* | 11/2011 | Candelaria | | 711/103 |

FOREIGN PATENT DOCUMENTS
WO 2008/154216 12/2008

\* cited by examiner

*Primary Examiner* — Michael Krofcheck
(74) *Attorney, Agent, or Firm* — Zilka-Kotab, PC

(57) ABSTRACT

According to one embodiment, a method for using flash memory in a storage cache comprises receiving data to be cached in flash memory of a storage cache, at least some of the received data being received from at least one of a host system and a storage medium, selecting a block of the flash memory for receiving the data, buffering the received data until sufficient data has been received to fill the block, and overwriting existing data in the selected block with the buffered data. According to another embodiment, a method comprises receiving data, at least some of the data being from a host system and/or a storage medium, and sequentially overwriting sequential blocks of the flash memory with the received data. Other devices and methods for working with flash memory in a storage cache according to various embodiments are included and described herein.

21 Claims, 6 Drawing Sheets

ACHIEVING A HIGH THROUGHPUT IN A STORAGE CACHE APPLICATION USING A FLASH SOLID STATE DISK

BACKGROUND

1. Field of the Invention

The present invention relates generally to memory devices. In particular, the present invention relates to achieving a high throughput in a storage cache application using a flash solid state disk.

2. Background of the Invention

The use of Flash memory in storage has mushroomed in the last few years with flash memory pricing dropping below that of DRAM. Flash memory is usually deployed as a disk replacement in the form of a solid state disk (SSD) in markets where performance is critical. SSD is still more expensive by an order of magnitude compared with hard disk drives. A more cost effective solution is to exploit the relative low cost of Flash memory compared with DRAM by augmenting the DRAM cache in a storage controller with Flash memory. As a substitute or as a supplement to DRAM, the performance of Flash memory degrades when write locations are random, which is a typical occurrence in a caching environment. This degradation in performance is generally caused by Write Amplification.

In a SSD, Write Amplification is the result of Flash memory's resistance to being rewritten in place. With Flash memory, a block must be erased first before it can be written again. So, an update to a memory location is written in a different block while the original data is marked invalid. Eventually, invalid data appear in many different blocks in the SSD, simply taking up space and not providing any benefit to the SSD. In order to reclaim memory for new data, the blocks need to be erased prior to a writing operation. If the entire block contains nothing but invalid data, then the block can be erased quickly. However, if there are still valid data present in the block, they must be moved to another location before the block can be erased. Identifying blocks to be erased and relocating valid data in those blocks is a process known as garbage collection.

Typically, at least 20% of the actual available memory of a SSD is reserved for garbage collection. This means that when the SSD reaches its reported (perceived) capacity, 20% of the data are presumably invalid. Assuming even distribution for random workloads, on average this means that 80% of each erasable block contains valid data that must be relocated. Accordingly, to reclaim one erase block in order to write new data, valid data from five blocks have to be read and relocated to four other blocks. This process, in which a write operation may trigger multiple read/write operations, is known as Write Amplification. The amount of work required is inversely proportional to the amount of reserved space in the SSD. Since Write Performance hurts overall sustained throughput, some SSD vendors recommend reserving 50% of available memory if the SSD is to be used for random write workload most of the time. Some memory devices, such as NAND flash memory devices, possess finite write/erase endurance and/or limited data retention. Tracking the write/erase endurance and data retention is often desired to recognize a current usefulness and reliability of such memory.

BRIEF SUMMARY

According to one embodiment, a method for using flash memory in a storage cache comprises receiving data to be cached in flash memory of a storage cache, at least some of the received data being received from at least one of a host system and a storage medium, selecting a block of the flash memory for receiving the data, buffering the received data until sufficient data has been received to fill the block, and overwriting existing data in the selected block with the buffered data.

In another embodiment, a method for using flash memory in a storage cache includes receiving data to be cached in flash memory of a storage cache, at least some of the received data being received from at least one of a host system and a storage medium, and sequentially overwriting sequential blocks of the flash memory with the received data. All writing to the flash memory is performed sequentially to sequential blocks according to this embodiment.

A method for using flash memory in a storage cache, according to another embodiment, includes writing data to a block of flash memory of a storage cache, the writing overwriting valid data in the block, and deciding whether to move the valid data in the block being overwritten or whether to destage the valid data in the block being overwritten, the decision being made by a higher cache layer. The method also includes overwriting the valid data in the block being overwritten during read caching when the higher cache layer decides to destage the valid data in the block being overwritten. Further the method includes reading and destaging the valid data in the block being overwritten during write caching when the higher cache layer decides to destage the valid data in the block being overwritten, and reading and inserting the plurality of valid data in the block being overwritten into a stream of new data being written to the flash memory when the higher cache layer decides to preserve the plurality of valid data in the block being overwritten.

In one embodiment of a data storage device, the data storage device comprises flash memory, an interface for receiving data to be cached in the flash memory, and a buffer for buffering the received data until sufficient data has been received to fill a block of the flash memory. In this embodiment, existing data in the selected block is overwritten with the buffered data.

According to another embodiment, a data storage device includes flash memory, an interface for receiving data to be cached in the flash memory, and a controller for sequentially overwriting sequential blocks of the flash memory with the received data. In this embodiment, all writing to the flash memory is performed sequentially to sequential blocks.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
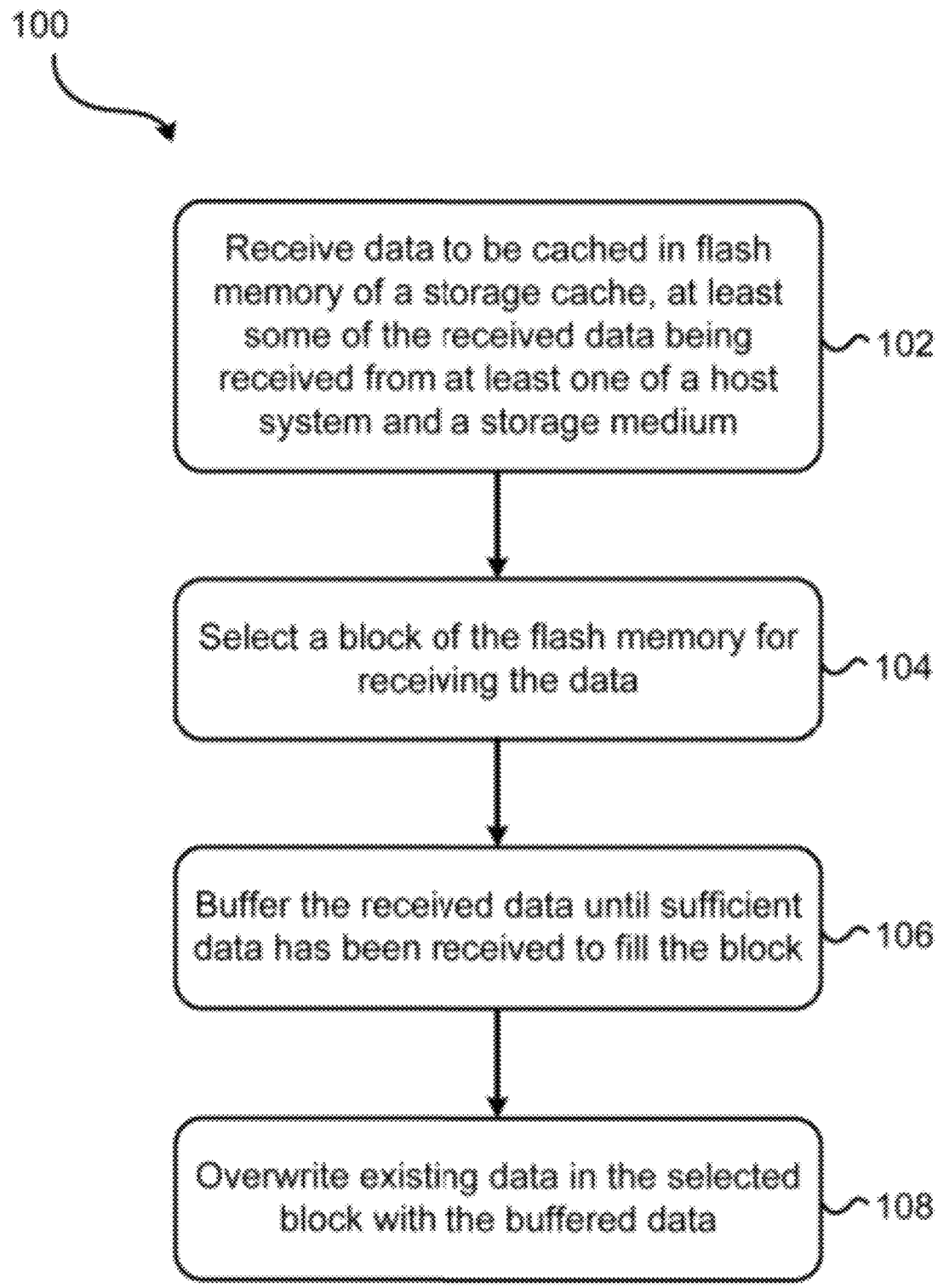
FIG. 1 illustrates a flowchart of a method for using flash memory in a storage cache according to one embodiment.

The following description is made for the purpose of illustrating the general principles of the present invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified. The following description discloses methods and systems to reduce and/or eliminate Write Amplification when Flash memory is used in a caching environment in order to maintain the high throughput desired in certain environments without having to reserve a sizable amount of memory for garbage collection.

In one general embodiment, a method for using Flash memory in a storage cache comprises receiving data to be cached in Flash memory of a storage cache, at least some of the received data being received from at least one of a host system and a storage medium; selecting a block of the Flash memory for receiving the data; buffering the received data until sufficient data has been received to fill the block; and overwriting existing data in the selected block with the buffered data.

In another general embodiment, a method for using Flash memory in a storage cache comprises receiving data to be cached in Flash memory of a storage cache, at least some of the received data being received from at least one of a host system and a storage medium; and sequentially overwriting sequential blocks of the Flash memory with the received data, wherein all writing to the Flash memory is performed sequentially to sequential blocks.

In another general embodiment, a method for using Flash memory in a storage cache comprises writing data to a block of Flash memory of a storage cache, the writing overwriting valid data in the block; deciding whether to move the valid data in the block being overwritten or whether to destage the valid data in the block being overwritten, the decision being made by a higher cache layer; overwriting the valid data in the block being overwritten during read caching when the higher cache layer decides to destage the valid data in the block being overwritten; reading and destaging the valid data in the block being overwritten during write caching when the higher cache layer decides to destage the valid data in the block being overwritten; and reading and inserting the plurality of valid data in the block being overwritten into a stream of new data being written to the Flash memory when the higher cache layer decides to preserve the plurality of valid data in the block being overwritten.

In yet another general embodiment, a data storage device comprises Flash memory; an interface for receiving data to be cached in the Flash memory; and a butler for buffering the received data until sufficient data has been received to fill a block of the Flash memory, wherein existing data in the selected block is overwritten with the buffered data.

In another general embodiment, a data storage device comprises Flash memory; an interface for receiving data to be cached in the Flash memory; and a controller for sequentially overwriting sequential blocks of the Flash memory with the received data, wherein all writing to the Flash memory is performed sequentially to sequential blocks.

More illustrative information will now be set forth regarding various optional architectures and features with which the foregoing framework may or may not be implemented, as implemented by a user of the system and/or methods disclosed herein. It should be strongly noted that the following information is set forth for illustrative purposes and should not be construed as limiting in any manner. Any of the following features may be optionally incorporated with or without any combination of the other features described.

According to some embodiments, a workload may be presented to a Flash controller in a SSD that renders data movement unnecessary prior to block erasure in the Flash device. This can be done by presenting purely sequential writes to the Flash device and/or by doing strictly erase-block-sized writes to the SSD. By removing the erasure steps, the write throughput delivered by the Flash device can be maximized or at least significantly increased. The actual random workload and the resulting garbage collection, in some approaches, may be handled at a higher level above the SSD in the storage controller, taking into consideration some factors, such as current disk, SSD activity, etc., to determine if the data in the cache should be destaged to the disk (for write data), discarded (for read data), or relocated (for either type of data). By coupling the destage option and discard option with relocation, the amount of Write Amplification can be more finely tuned in an intelligent manner instead of simply allowing the Flash controller in the SSD to blindly perform garbage collection unchecked based on block occupancy alone. The flexibility of this new scheme, according to some embodiments, results in a higher throughput due to the reduction in Write Amplification without having to reserve additional memory for garbage collection.

More specifically, the write throughput of a SSD is higher when it is accessed sequentially or using erase-block-sized writes rather than during randomly initiated and performed write/erase operations. This is due to the fact that random write throughput is degraded by Write Amplification. Write caching is affected more by Write Amplification than read caching. This effect is observed because even though both read and write data can be written sequentially in the read cache and the write cache, respectively, write data that has experienced write hits will cause areas in the write cache to be marked as invalid. The random distribution of invalid data in the erasable blocks is the major cause for Write Amplification. One simplistic way to ease Write Amplification is to reserve a huge amount of memory, e.g., 50%, for garbage collection. In some embodiments of the present invention, no more than the minimum amount of reserve space for garbage collection as suggested by SSD vendors for proper operation is reserved for garbage collection. Furthermore, some embodiments can work with off-the-shelf SSD units using any type of Flash controllers.

For both read and write caches, according to some embodiments, sequential writing and/or erase-block-sized I/Os are used, and the higher cache layer may decide whether to move the valid data contained in the block being overwritten, or to evict/destage this data. If the decision is to overwrite and evict/destage the valid data, the data is simply overwritten in the case of a read cache, and the data is read and destaged before being overwritten in the case of a write cache. If the decision is to preserve the valid data, the data is read and inserted into the stream of new data being written to the Flash device. The Flash device does not know that the valid data was moved. This allows the higher level to control the Write Amplification to stay within a desired limit and/or to minimize the Write Amplification in general. The decision, as to which valid data should be preserved, can be based on one or more of caching criteria, such as frequency of hits on the page, frequency of hits in the region, recency of hits on the page, recency of hits in the region, hints from applications, etc. Of course, any other techniques known in the art to one of ordinary skill can be used to evaluate the value of a page in cache.

When sequential writes are used, according to some embodiments, the Flash device is written to in a cyclic fashion, starting from the lowest address all the way up to the highest address and resuming back from the lowest address overwriting what was written previously while preserving only what has been deemed important from the caching perspective. Any criteria can be used to determine what data is important from a caching perspective. When erase-block-sized I/Os are used, more flexibility is available and any known caching technique, e.g., least recently used (LRU), adaptive replacement cache (ARC), least frequently used (LFU), etc., may be used to select which erase-block to overwrite. Also, in some embodiments, within that erase-block, it can be determined if data items should be preserved and if so, those data items may be moved to be included in the stream of data being writing to the device.

Now referring to FIG. 1, a method 100 for using Flash memory in a storage cache is shown according to one embodiment. The method 100, which may function as a read and/or write cache, may be used in any desired environment, including, but not limited to, a network, e.g., the World Wide Web, a local area network (LAN), a wide area network (WAN), etc., a computer system, a programmable media device, etc.

In operation 102, data is received to be cached in Flash memory of a storage cache, at least some of the received data being received from at least one of a host system and a storage medium.

In some more embodiments, at least about 80% of the Flash memory present in the storage cache may be available for writing, more preferably more than about 90% of the Flash memory present in the storage cache may be available for writing, even more preferably more than about 95% of the Flash memory present in the storage cache may be available for writing.

In operation 104, a block of the Flash memory is selected for receiving the data. Any block of the Flash memory may be selected, and operations may be performed depending on which block of memory is selected. For example, if the block selected includes data already written in the block of memory, there may be operations to copy and move this data before erasing and writing to the block of data. Other operations are also possible, such as simply erasure, copying and replacing the data already present after writing the new data, etc.

In operation 106, the received data is buffered until sufficient data has been received to fill the block. In some approaches, the data sufficient to fill the block may be erase-block-sized. Of course, each SSD may have a different erase-block size, and therefore the data sufficient to fill the block may be different for each individual SSD.

In operation 108, existing data in the selected block is overwritten with the buffered data. Typically, the overwriting will comprise erasing the block and writing the new data.

In some approaches, the method 100 may further comprise determining whether to relocate at least some of the existing data in the block prior to overwriting the existing data in the block. If so, the at least some of the existing data in the block may be inserted to a stream of the data being received. In some further approaches, the determining whether to relocate the at least some of the existing data in the block may be based on at least one caching criteria. The caching criteria may comprise a technique to evaluate a value of a page in the storage cache, and may be selected from any technique known in the art, such as LRU, ARC, LFU, etc. In some specific approaches, the technique to evaluate the value of the page in the storage cache includes evaluating the frequency of hits on the page or region and/or evaluating information from at least one application.

The method 100, according to some embodiments, may also include determining whether to destage at least some of the existing data in the block to the storage medium coupled to the storage cache, and destaging the at least some of the existing data to the storage medium if the determination is to destage the at least some of the existing data.

In more embodiments, the method 100 may further comprise determining whether to discard at least some of the existing data in the block to a storage medium coupled to the storage cache. If it is allowed to discard at least some of the existing data in the block to a storage medium coupled to the storage cache, then the at least some of the existing data in the block may be discarded to a storage medium, or it may be allowed for the at least some of the existing data in the block to be discarded. The method 100 may also include allowing the at least some of the existing data to be erased, or it may include erasing the at least some of the existing data in the block.

Figure 2:
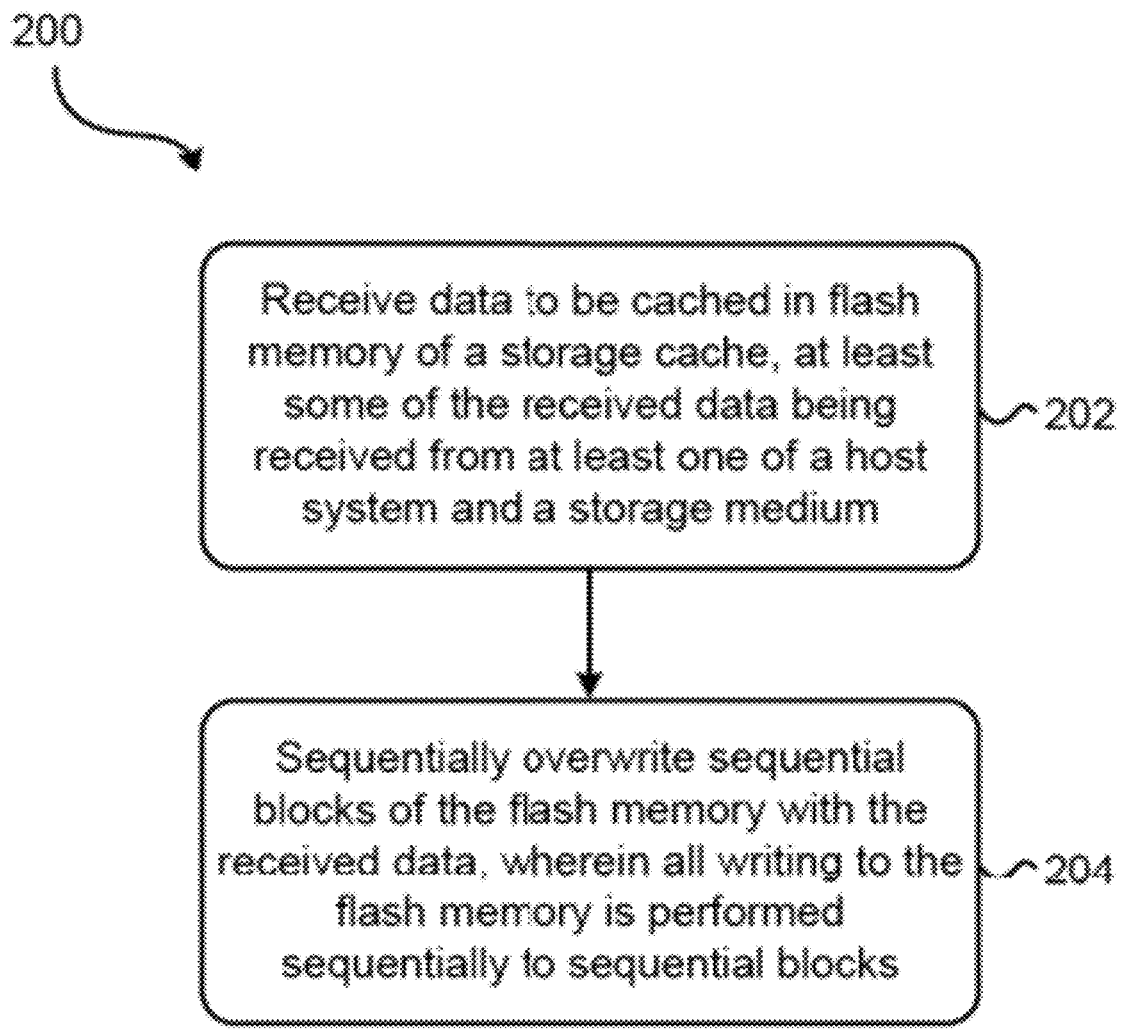
FIG. 2 illustrates a flowchart of a method for using flash memory in a storage cache according to one embodiment.

Now referring to FIG. 2, a method 200 for using Flash memory in a storage cache is shown according to one embodiment. The method 200, which may function as a read and/or write cache, may be used in any desired environment, including, but not limited to, a network, e.g., the World Wide Web, a local area network (LAN), a wide area network (WAN), etc., a computer system, a programmable media device, etc.

In operation 202, data is received to be cached in Flash memory of a storage cache, at least some of the received data being received from at least one of a host system and a storage medium.

In operation 204, sequential blocks of the Flash memory are sequentially overwritten with the received data, wherein all writing to the Flash memory is performed sequentially to sequential blocks.

In some approaches, the method 200 may further comprise determining whether to relocate at least some of the existing data in one of the blocks prior to overwriting the existing data in the one of the blocks. If the determination is to relocate at least some of the existing data (which could include relocating all of the existing data), the method may also include inserting any of the at least some existing data in the one or more blocks to a stream of the data being received. In some further approaches, the determination of whether to relocate at least some of the existing data in the block may be based on at least one caching criteria. The caching criteria may include a technique to evaluate a value of a page in the storage cache. Of course, any caching technique known in the art may be used to determine whether to relocate at least some of the existing data in the block. In even further approaches, the technique to evaluate the value of the page in the storage cache may comprise one or more of frequency of hits on the page or region, and information from at least one application.

In some embodiments, the method 200 may further comprise determining whether to destage at least some of the existing data in one of the blocks to a storage medium coupled to the storage cache. Also, the at least some of the existing data may be destaged to the storage medium if the determination is to destage the at least some of the existing data.

According to some embodiments, at least about 80% of the Flash memory present in the storage cache may be available for writing, more preferably more than about 90% of the Flash memory present in the storage cache may be available for writing, even more preferably more than about 95% of the Flash memory present in the storage cache may be available for writing.

In more embodiments, the sequence of the blocks may start from an address and the writing may resume at that address upon writing to all of the available blocks. For example, if a block has eight addresses, (0-7), and writing starts at address 5, then writing will continue to address 6, then to address 7, then to address 0, . . . , then to address 4. If the writing is stopped at any time before returning to address 5, such as at address 1, then when writing resumes, it will start at address 2, then proceed to address 3, until it returns to address 5 and begins the cycle again.

Figure 3:
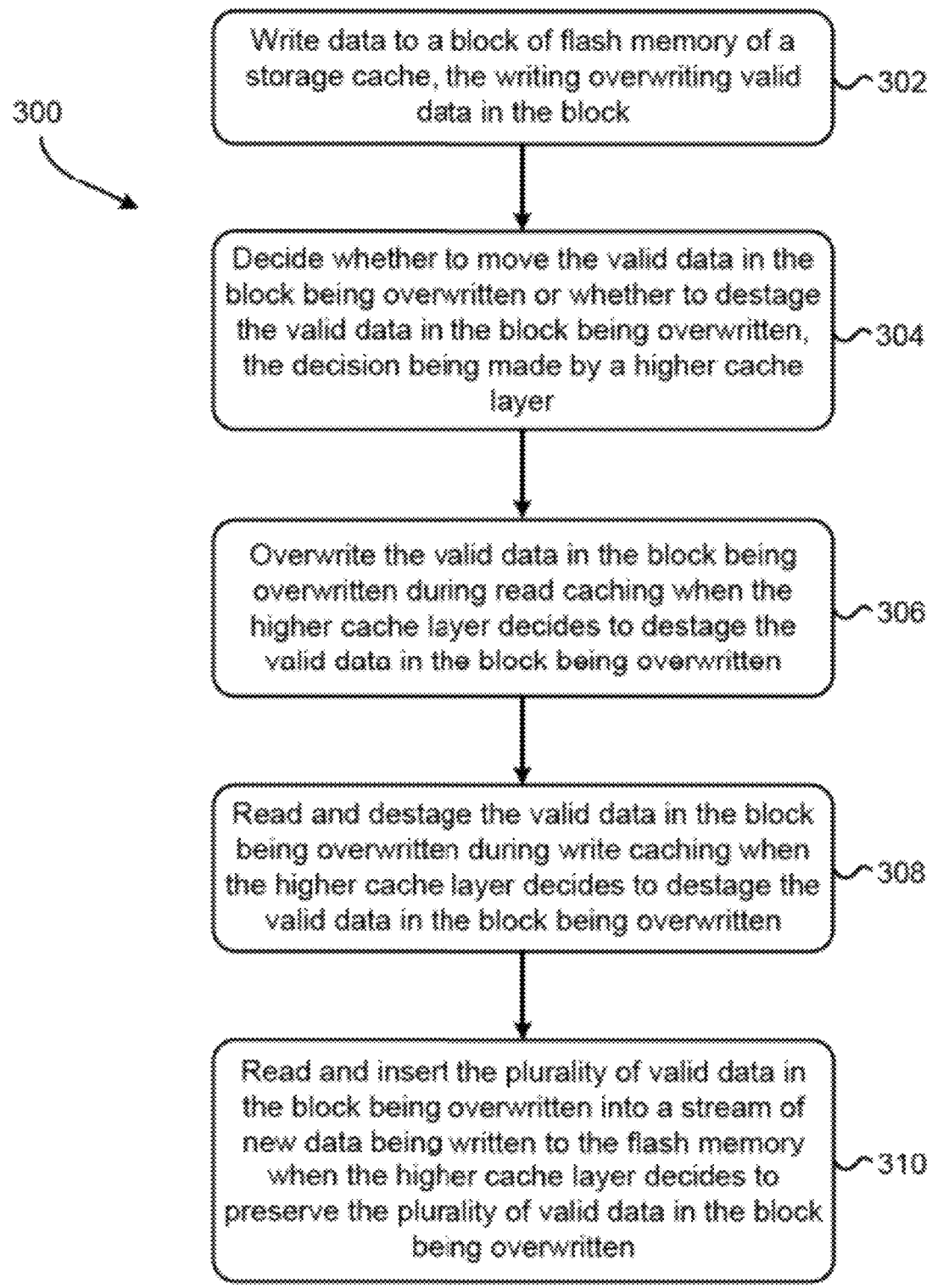
FIG. 3 shows a flowchart of a method for using flash memory in a storage cache according to one embodiment.

Now referring to FIG. 3, a method 300 for using Flash memory in a storage cache is shown according to one embodiment. The method 300, which may function as a read and/or write cache, may be used in any desired environment, including, but not limited to, a network, e.g., the World Wide Web, a local area network (LAN), a wide area network (WAN), etc., a computer system, a programmable media device, etc.

In operation 302, data is written to a block of Flash memory of a storage cache, the writing overwriting valid data in the block. For example, if there is any data in the block, typically it will be removed and/or erased, and then the new data may be written to the block. In operation 304, a decision is made by a higher cache layer as to whether to move the valid data in the block being overwritten or whether to destage the valid data in the block being overwritten. The higher cache layer is above the Flash memory controller of the storage cache. Any criteria may be used to determine whether to move the valid data in the block being overwritten, such as frequency of use of the data, criticality of the data (possibly indicated by a bit, 0 or 1), last access of the data, etc. These criteria may be used, as an example, to determine that the data should be moved if it has been accessed in the last 30 days, 10 days, 24 hours, etc. In another example, the data may be moved if it is accessed frequently, e.g., more than 10 times per day, more than 30 times per month, etc. Of course, many more schemes may be developed for determining whether to move the data or not, and or not meant to be limiting on the present invention. In operation 306, the valid data is overwritten in the block being overwritten during read caching when the higher cache layer decides to destage the valid data in the block being overwritten. In operation 308, the valid data in the block being overwritten is read and destaged during write caching when the higher cache layer decides to destage the valid data in the block being overwritten. In operation 310, the plurality of valid data in the block being overwritten is read and inserted into a stream of new data being written to the Flash memory when the higher cache layer decides to preserve the plurality of valid data in the block being overwritten.

In some embodiments, the Flash memory controller may be prevented from knowing the valid data was moved. This preventing of the Flash memory controller from knowing about the movement may allow the higher cache layer to control writing to the storage cache to reduce Write Amplification and/or to keep the Write Amplification within a desired limit. For example, if Write Amplification is desired to only increase the write/reads by a factor of two, four, five, etc., then the Write Amplification's effects on this total number of reads/writes can be tuned to fall within the desired limits. The desired limit may be set according to any criteria, such as a limit corresponding to an optimal performance range, a limit corresponding to a value gained from experience of operating the system, a limit designed to produce a result, such as reducing the increase in the amplification of the write/reads by a certain factor, etc. Of course, any criteria may be used for determining the desired limit, and the limit may be set by a user, by an automated routine, etc., and the descriptions of the desired limit are not meant to be limiting on the present invention in any way.

In more embodiments, the sequence of the blocks may start from an address and the writing may resume at that address upon writing to all of the available blocks. For example, if a block has eight addresses, (0-7), and writing starts at address 5, then writing will continue to address 6, then to address 7, then to address 0, . . . , then to address 4. If the writing is stopped at any time before returning to address 5, such as at address 1, then when writing resumes, it will start at address 2, then proceed to address 3, until it returns to address 5 and begins the cycle again.

In some approaches, writing data to the Flash memory may be performed in an erase-block-sized input and output. The erase-block-sized input and output may use a caching technique to select an erase-block to overwrite, such as would be known to one of skill in the art. For example, LRU, ARC, LFU, etc., may be used to select an erase-block to overwrite.

It should be noted that the invention can take the form of an entirely hardware embodiment, an entirely software embodiment, or an embodiment containing both hardware and software elements. For example, in one embodiment, a system may include a Flash memory device having a plurality of memory blocks, where at least one of the blocks has monitor data written therein, and the at least one block has been written to a plurality of times prior to writing the monitor data. The system may also include circuitry for addressing the blocks and a secondary memory storing a copy of the monitor data. Additionally, the system may include a storage controller and a plurality of Flash memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
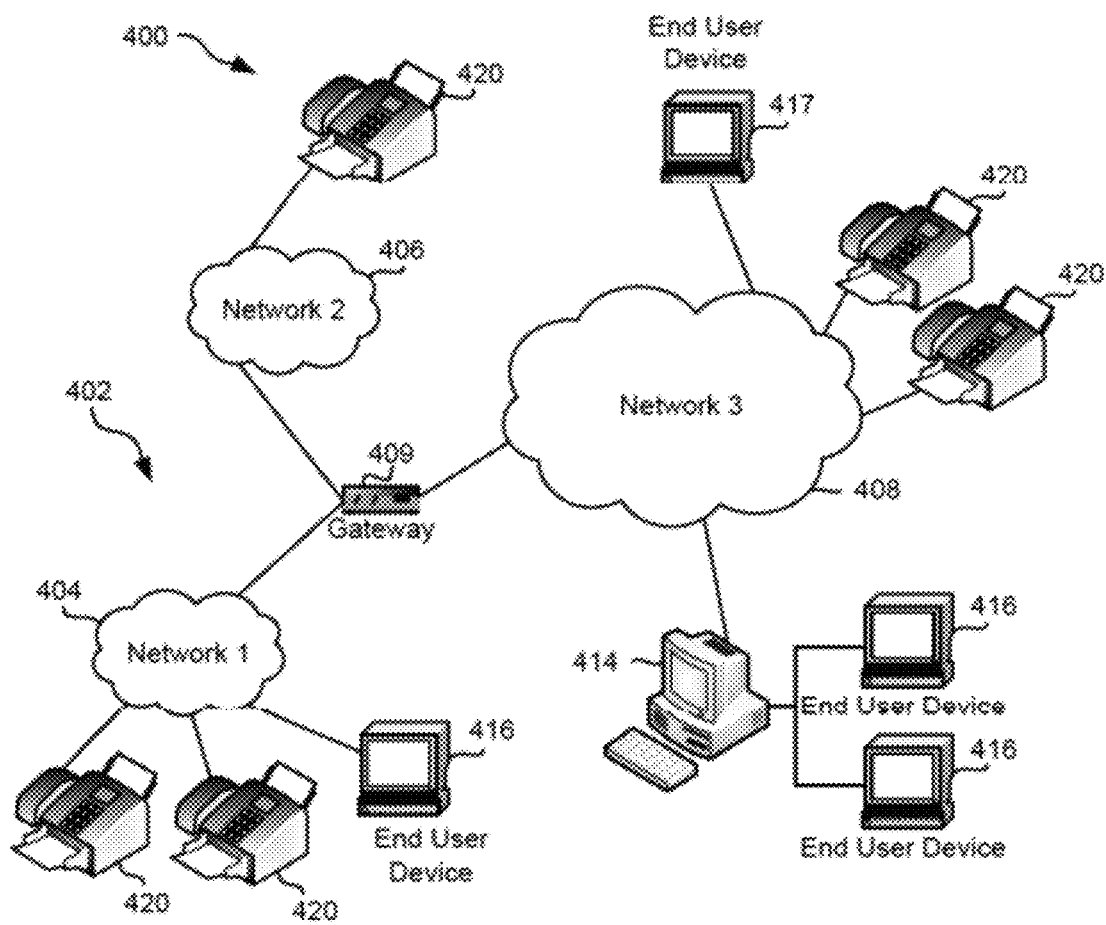
FIG. 4 shows a schematic diagram of a computer system for using flash memory in a storage cache according to one embodiment.

FIG. 4 illustrates a network architecture 400, in accordance with one embodiment. As an option, the functionality of FIGS. 1-3 may be implemented in the context of the network architecture 400. However, the functionality of FIGS. 1-3 may be carried out in any desired environment. It should be noted that the aforementioned definitions may apply during the present description.

As shown in FIG. 4, a plurality of remote networks 402 are provided including a first remote network 404 and a second remote network 406. A gateway 407 may be coupled between the remote networks 402 and a proximate network 408. In the context of the present network architecture 400, the networks 404, 406 may each take any form including, but not limited to a LAN, a WAN such as the Internet, PSTN, internal telephone network, etc.

In use, the gateway 407 serves as an entrance point from the remote networks 402 to the proximate network 408. As such, the gateway 407 may function as a router, which is capable of directing a given packet of data that arrives at the gateway 407, and a switch, which furnishes the actual path in and out of the gateway 407 for a given packet.

Further included is at least one data server 414 coupled to the proximate network 408, and which is accessible from the remote networks 402 via the gateway 407. It should be noted that the data server(s) 414 may include any type of computing device/groupware. Coupled to each data server 414 is a plurality of user devices 416. Such user devices 416 may include a desktop computer, lap-top computer, hand-held computer, printer or any other type of logic. It should be noted that a user device 417 may also be directly coupled to any of the networks, in one embodiment.

A facsimile machine 420 or series of facsimile machines 420 may be coupled to one or more of the networks 404, 406, 408. It should be noted that databases and/or additional components may be utilized with, or integrated into, any type of network element coupled to the networks 404, 406, 408. In the context of the present description, a network element may refer to any component of a network.

Figure 5:
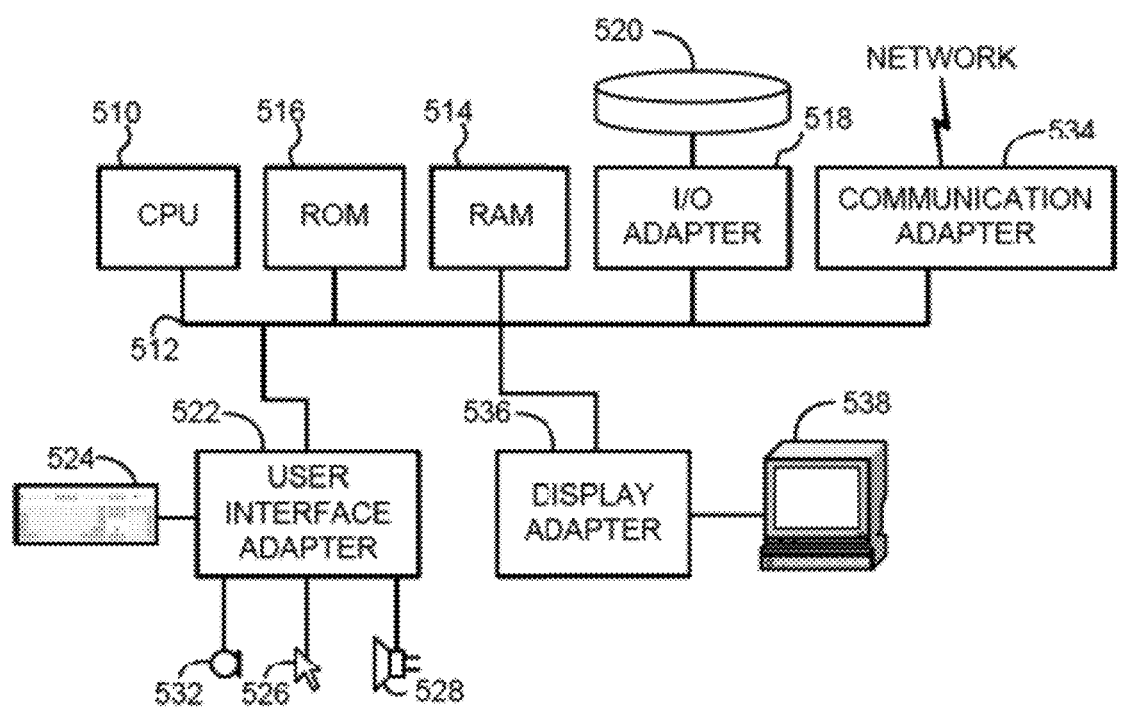
FIG. 5 shows a schematic diagram of a computer system for using flash memory in a storage cache according to one embodiment.

FIG. 5 shows a representative hardware environment associated with a user device 416 of FIG. 4, in accordance with one embodiment. Such figure illustrates a typical hardware configuration of a workstation having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen and a digital camera (not shown) to the bus 512, communication adapter 534 for connecting the workstation to a communication network 535 (e.g., a data processing network) and a display adapter 536 for connecting the bus 512 to a display device 538.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 6:
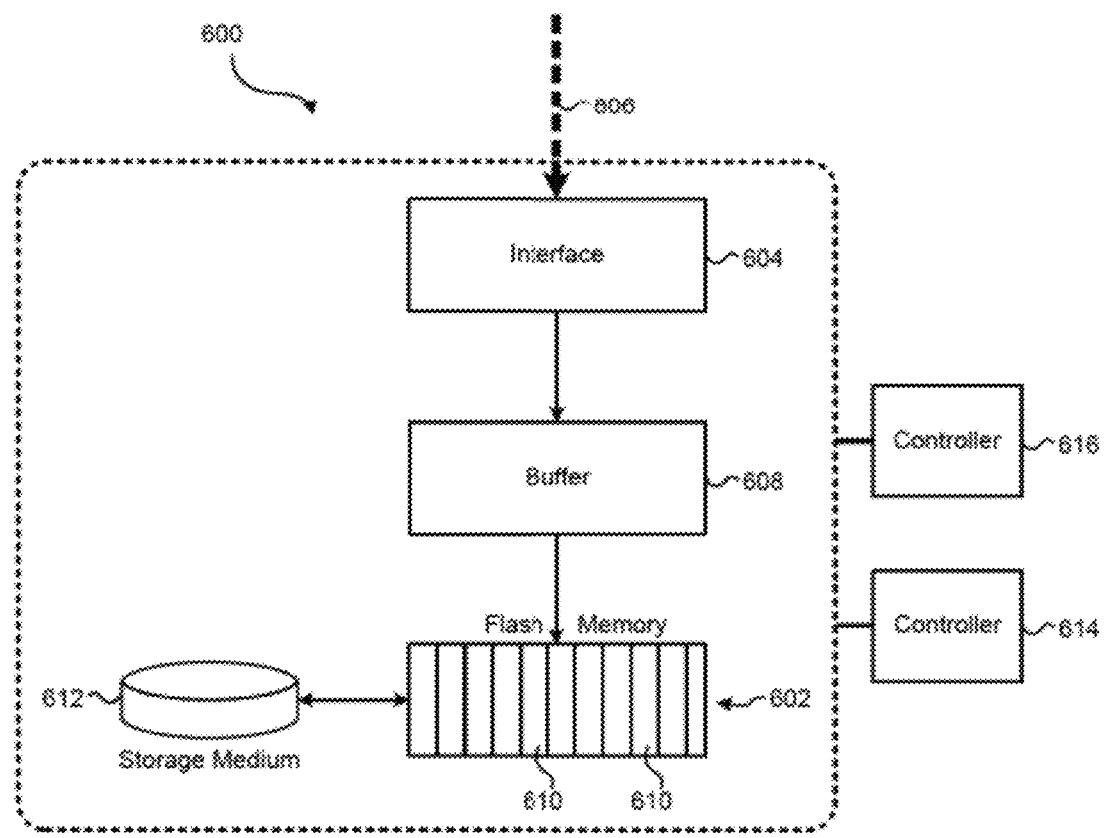
FIG. 6 shows a simplified schematic diagram of a data storage device according to one embodiment.

Now referring to FIG. 6, according to one embodiment, a data storage device 600 comprises Flash memory 602 and an interface 604 for receiving data 606 to be cached in the Flash memory 602. In addition, the data storage device 600 comprises a buffer 608 for buffering the received data until sufficient data has been received to fill a block 610 of the Flash memory 602, wherein existing data in the selected block 610 is overwritten with the buffered data. Typically, the overwriting will comprise erasing the block 610 and writing the new data.

In some approaches, the data storage device 600 may further comprise a storage medium 612 coupled to the Flash memory 602, the Flash memory 602 caching data to be written to the storage medium 612. In further approaches, the data storage device 600 may comprise a controller 614 for determining whether the existing data has been written to the storage medium 612 prior to being overwritten.

With continued reference to FIG. 6, in another embodiment, a data storage device 600 comprises Flash memory 602 and an interface 604 for receiving data 606 to be cached in the Flash memory 602. In addition, the data storage device 600 comprises a controller 616 for sequentially overwriting sequential blocks 610 of the Flash memory 602 with the received data 606, wherein all writing to the Flash memory 602 is performed sequentially to sequential blocks 610. Note that various components listed above may be on a host system, on a network, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for using flash memory in a storage cache, the method comprising:
   receiving data to be cached in flash memory of a storage cache, at least some of the received data being received from at least one of a host system and a storage medium;
   selecting a block of the flash memory for receiving the data;
   buffering the received data until sufficient data has been received to fill the block;
   overwriting existing data in the selected block with the buffered data;
   determining whether to relocate at least some of the existing data in the block prior to overwriting the existing data in the block; and
   inserting the at least some of the existing data in the block to a stream of the data being received when the determination is to relocate the at least some of the existing data.

2. The method of claim 1, further comprising:
   determining whether to destage at least some of the existing data in the block to the storage medium coupled to the storage cache;
   destaging the at least some of the existing data to the storage medium when the determination is to destage the at least some of the existing data.

3. The method of claim 1, further comprising:
   determining whether to discard at least some of the existing data in the block; and
   allowing the at least some of the existing data to be erased.

4. The method of claim 1, wherein at least about 80% of the flash memory present in the storage cache is available for writing.

5. The method of claim 1, wherein the received data that is buffered until sufficient data has been received to fill the block is erase-block-sized.

6. The method of claim 1, wherein the determining whether to relocate the at least some of the existing data in the block is based on at least one caching criteria, the caching criteria comprising a technique to evaluate a value of a page in the storage cache.

7. The method of claim 6, wherein the technique to evaluate the value of the page in the storage cache is selected from the group consisting of:
   frequency of hits on the page or region, and
   information from at least one application.

8. A method for using flash memory in a storage cache, the method comprising:
   receiving data to be cached in flash memory of a storage cache, at least some of the received data being received from at least one of a host system and a storage medium; and
   sequentially overwriting sequential blocks of the flash memory with the received data, wherein all writing to the flash memory is performed sequentially to sequential blocks;
   determining whether to relocate at least some existing data in one of the blocks to another portion of the flash memory prior to overwriting the existing data in the one of the blocks; and
   inserting the at least some of the existing data in the one of the blocks to a stream of the data being received when the determination is to relocate the at least some of the existing data.

9. The method of claim 8, further comprising:
   determining whether to destage at least some existing data in one of the blocks to the storage medium coupled to the storage cache; and when the determination is to destage the at least some of the existing data, destaging the at least some of the existing data to the storage medium.

10. The method of claim 8, wherein at least about 80 % of the flash memory present in the storage cache is available for writing.

11. The method of claim 8, wherein a sequence of the blocks starts from an address and the writing resumes at that address upon writing to all of the available blocks.

12. The method of claim 8, wherein the determining whether to relocate the at least some of the existing data in the block is based on at least one caching criteria, the caching criteria comprising a technique to evaluate a value of a page in the storage cache.

13. The method of claim 12, wherein the technique to evaluate the value of the page in the storage cache is selected from the group consisting of:
frequency of hits on the page or region, and
information from at least one application.

14. A method for using flash memory in a storage cache, the method comprising:
writing data to a block of flash memory of a storage cache, the writing overwriting valid data in the block;
deciding whether to move the valid data in the block being overwritten or whether to destage the valid data in the block being overwritten, the decision being made by a higher cache layer;
when the higher cache layer decides to destage the valid data in the block being overwritten, overwriting the valid data in the block being overwritten during read caching;
when the higher cache layer decides to destage the valid data in the block being overwritten, reading and destaging the valid data in the block being overwritten during write caching; and
when the higher cache layer decides to preserve the valid data in the block being overwritten, reading and inserting the valid data in the block being overwritten into a stream of new data being written to the flash memory.

15. The method of claim 14, wherein the flash memory controller is prevented from knowing the valid data was moved, the preventing allowing the higher cache layer to control writing to the storage cache to reduce write amplification or keep the write amplification within a desired limit.

16. The method of claim 14, wherein the writing data to the flash memory is performed in a sequence, the sequence starting from a first address and continuing sequentially through all available addresses, the writing resuming at the first address thereafter.

17. The method of claim 14, wherein the writing data to the flash memory is performed in an erase-block-sized input and output, the erase-block-sized input and output using a caching technique to select an erase-block to overwrite.

18. A system for using flash memory in a storage cache, comprising:
flash memory;
an interface for receiving data to be cached in the flash memory;
a buffer for buffering the received data until sufficient data has been received to fill a block of the flash memory, wherein existing data in the selected block is overwritten with the buffered data; and
a controller configured to determine whether to relocate at least some of the existing data in the block prior to the overwriting the existing data in the block, the controller being configured to cause inserting of at least some of the existing data in the block to a stream of the data being received when the determination is to relocate the at least some of the existing data.

19. The system of claim 18, further comprising:
a storage medium coupled to the flash memory, the flash memory caching data to be written to the storage medium.

20. The system of claim 19, further comprising:
a controller for determining whether the existing data has been written to the storage medium prior to being overwritten.

21. A system for using flash memory in a storage cache, comprising:
flash memory;
an interface for receiving data to be cached in the flash memory;
a controller for sequentially overwriting sequential blocks of the flash memory with the received data, wherein all writing to the flash memory is performed sequentially to sequential blocks; and
a storage medium coupled to the flash memory, the flash memory caching data to be written to the storage medium,
wherein the controller is configured to determine whether to relocate at least some existing data in one of the blocks to another portion of the flash memory prior to overwriting the existing data in the one of the blocks; and
wherein the controller is configured to insert the at least some of the existing data in the one of the blocks to a stream of the data being received when the determination is to relocate the at least some of the existing data.

* * * * *